Patented Mar. 13, 1934

1,951,006

UNITED STATES PATENT OFFICE 1,951,006

LUMINESCENT TUBE

Frederick R. Balcar, Elizabeth, N. J., assignor to Air Reduction Company, Inc., New York, N. Y., a corporation of New York No Drawing. Application March 29, 1930,
Serial No. 440,166

2 Claims. (Cl. 176—125)

This invention relates to luminescent tubes containing gases which are caused to glow when an electrical discharge passes therethrough.

It is known that the introduction of vapors and gases in relatively small proportions to gas mixtures in luminescent tubes produces a marked effect upon the color of the light emitted when the tube is energized by an electric current. Carbon dioxide may be used in this way. Unfortunately, carbon dioxide is decomposed by the passage of the current, and the light effects produced thereby are transient. It has been suggested that carbon dioxide may be supplied at intervals to such a tube through an automatically actuated valve mechanism for the purpose of maintaining the required composition, but this has obvious disadvantages, particularly in respect to the complexity and cost of the necessary mechanism and the uncertainty of its operation.

It is the object of the present invention to provide a simple, effective and self-sustaining luminescent tube containing an evanescent component.

Another object of the invention is the provision of a luminescent tube capable of emitting especially substantially white or non-colored light.

A further object of the invention is the provision of gas compositions for luminescent tubes which when energized produce light of lavender shades.

In carrying out the invention, I may employ tubes of glass, quartz or the like either transparent or translucent. Such tubes usually have electrodes in the ends thereof with suitable lead-in wires extending through the tube. The electrodes may be disposed externally of the tubes. A suitable gas or mixture of gases is disposed therein at a pressure of, for example, 7 to 10 mm. of mercury.

If carbon dioxide is an essential part of the mixture, I place in the tube a small amount of a modifying agent such as calcium or magnesium carbonate or other substance either solid or liquid which, when subjected to the temperature resulting from the passage of current through the tube, will gradually give carbon dioxide to the atmosphere of the tube. Thus when the tube is energized, carbon dioxide is supplied continuously in relatively small quantity but sufficient to maintain a substantially constant concentration of carbon dioxide in the mixture. The composition of the gaseous mixture can be preserved, therefore, until the added substance is substantially exhausted and consequently the light emitted by the tube will remain unchanged during an extended period.

As an example of the invention, I may employ a tube containing neon and argon in varying proportions. A mixture of approximately 10% of argon with 90% of neon emits a lavender colored light. The proportions of the gases may vary widely, the colors and shades changing with the different compositions. I prefer to employ from 5 to 25% of argon, the balance being principally neon. The addition of carbon dioxide to the mixture of neon and argon, for example, results in a white or substantially colorless light. I, therefore, introduce a substance such as calcium or magnesium carbonate, which is capable of releasing carbon dioxide to the tube containing rare gases such as neon and argon. When the tube is energized, carbon dioxide is released, and I am able to produce the white or substantially colorless light until the modifying agent is exhausted. Such tubes have been operated for more than 700 hours without change of the light emitted.

In introducing the modifying agent to the tube, several methods may be employed: The agent may be supported inside the electrode; it may be attached to the electrode; it may be coated on the wall of the tube or electrode chamber; or it may be simply deposited in the electrode chamber or in the path of the discharge through the tube.

I may employ likewise other modifying agents, for example, a suitable hydride such as magnesium hydride can be used to maintain a trace a hydrogen in the tube in admixture with the gases therein to effect a desired change in the color of the light emitted when the tube is energized.

Various changes may be made in the compositions of the gas mixture and in other details of the invention without sacrificing the advantages described.

I claim:

1. A luminescent tube containing a mixture of approximately 90% neon and 10% argon and a substance capable of releasing carbon dioxide when the tube is energized by an electric current.

2. A luminescent tube containing a mixture of approximately 90% neon and 10% argon and a solid carbonate capable of releasing carbon dioxide when the tube is energized by an electric current.

FREDERICK R. BALCAR.